Patented Apr. 19, 1932

1,854,353

UNITED STATES PATENT OFFICE

MAX WALLERSTEIN, OF NEW YORK, N. Y., ASSIGNOR TO WALLERSTEIN COMPANY, INC., OF NEW YORK, N. Y., A CORPORATION OF NEW YORK

PROCESS OF MAKING CHOCOLATE SIRUP AND PRODUCT THEREOF

No Drawing.   Application filed March 27, 1928. Serial No. 265,222.

This invention relates to a method or process of producing a substantially stable, non-thickening chocolate syrup and to the syrup produced thereby.

The chocolate syrup of commerce, such as used at soda fountains, home consumption and the like, is usually prepared by first mixing sugar and the cocoa powder of commerce together in suitable proportions, the proportion of the cocoa powder generally used being from 10 to 15% of the amount of sugar used. To this mixture sufficient water is added to make a paste, and then more water in sufficient quantity to dissolve the sugar and give the syrup the proper concentration, this usually corresponding to a density of 30 to 40 Bé. at room temperature. This mixing of sugar, cocoa powder and water is slowly heated to 85° C. with constant stirring, being at times brought to a boil. After this heating, the density of the syrup is adjusted as desired by the addition of water and the finished syrup is then canned and sterilized, or a preservative as benzoate of soda is added. Such chocolate syrups, when freshly prepared, are smooth, flow freely and pour readily. Syrups thus prepared, however, retain these properties for a comparatively short time, and after a certain period, which varies from a few weeks to a few months, the syrup changes in appearance and physical characteristics. Such syrups gradually thicken, so that they are very difficult to pour and frequently set entirely so that they cannot be poured and thus are useless, and on this account are objectionable to the trade, and the custom has been to supply the trade with as nearly fresh syrup as possible in order to prevent loss because of this tendency to thicken in the mass.

Certain proposals have been made for producing an aqueous chocolate beverage which will have keeping qualities to enable the same to be stored or kept over extended periods of time. In the preparation of such chocolate beverages, however, the valuable cocoa fats are eliminated and such beverages are objectional for this and other reasons.

It is the object of the present invention to produce a chocolate syrup which will remain smooth and liquid so that it will flow freely and which does not set, so that it can be kept in stock for a considerable period, and in which the valuable cocoa fats are retained.

A further object of the invention is an improved process for producing a syrup having these desirable characteristics.

The causes of the thickening or setting of the syrup are not entirely understood, but I have discovered that this thickening or setting of the syrup, which usually occurs after the same has been kept for a considerable time, can be prevented by making the syrup in the presence of a suitable enzymatic material under proper conditions, and that the valuable cocoa fats may be retained in the syrup by carrying out the process under suitable control of the water content. This action of the enzyme is in the nature of a hydrolytic action, the enzyme having a converting or hydrolyzing action on certain of the constituents of the cocoa.

As one example of my process I may proceed as follows:

Preferably the starting material is the powdered cocoa of commerce, though under certain circumstances the cocoa bean itself may be used after it has been properly treated, as for instance by grinding. This powdered or ground cocoa, in the preferred way of carrying out the process, is first mixed with a certain amount of water, the amount of water being such that a fairly concentrated mixture is produced, that is, a concentration which will prevent the separation of the cocoa fats during the carrying out of the process. For an example, one hundred pounds of powdered cocoa are carefully mixed with about three hundred pounds of water, and the pH is adjusted to 7.1 by the addition of a suitable alkali, as soda-ash, and the mixture is slowly heated to about 80° C. At this temperature a thickening of the cocoa paste sets in, and after about one hour with the temperature preferably raised to say 90° C. the treatment of the paste is sufficiently complete for the enzymatic treatment.

The mass is then cooled to about 38° C. and one hundred grams of a suitable enzyme preparation, such as "Pancreatin", previously emulsified in water, are added and the mass allowed to stand a sufficient time for the enzymatic action to take place, say from 12 to 20 hours. By this method a substantially complete conversion of some of the cocoa constituents, chiefly cocoa starch, is effected. The necessary amount of sugar and water is then added, while stirring, to make a syrup having the desired density and desired proportion of sugar to cocoa, and the syrup may then be canned and sterilized if desired.

The chocolate syrup prepared in accordance with this process has very good keeping qualities, remains fluid and does not set to any substantial extent even after long periods of storage. Furthermore, all the fatty constituents of the raw cocoa have been preserved, which is very desirable in the production of commercial syrups of this character.

In a modification of my method the procedure may be substantially as follows:

One hundred pounds of the cocoa powder of commerce are thoroughly mixed with about three hundred pounds of water and the pH is adjusted to 5.5, and to this is preferably added a half pound of malt extract having a Lintner of 60°. The mass is heated and the thickening of the cocoa paste is carried out as above described. After the thickening, the mass is cooled to about 50° to 55° C. and two pounds of malt syrup having a Lintner of 60° to 100°, previously dissolved in a little water, are mixed in and the mixture is allowed to stand for twelve to twenty-four hours at 50° to 55° C. Some of the constituents of the cocoa paste, chiefly cocoa starch, is substantially converted and the syrup is finished by the suitable addition of sugar and water, with stirring, as above described, the cocoa fat being retained in the syrup.

The invention is not restricted to the enzyme preparation "Pancreatin" or a malt enzyme preparation, but other enzyme preparation may be used, such for instance the enzyme preparation derived from *Aspergillus oryzœ* known as Takadiastase or the enzyme preparation known as "Rapidase". It will be understood, of course, that for each particular enzyme preparation the pH is so adjusted as to produce suitable conditions under which the enzyme preparation will act on the cocoa paste. The amount of the enzyme preparation to be used and the time necessary to bring about conversion depends, of course, upon the activity of the particular enzyme preparation employed, the more active the preparation the smaller the amount of the preparation necessary and the shorter time needed for effecting the conversion. Of course under certain circumstances a mixture of two or more of the named enzyme preparations may be used.

While preferably the thickening and conversion of the cocoa paste is effected prior to the addition of the sugar, I have found that good results are obtained if sugar is used from the beginning and the enzyme preparation allowed to act in the presence of the sugar.

No claims are made specifically in this application to the use of the enzyme preparation known as Rapidase, as claims to the use of this enzyme in the process will be made in a divisional application.

What I claim is:

1. The process of producing a fluid substantially non-thickening cholocate syrup from cocoa, which consists in subjecting a pasty or syrupy mixture of cocoa and water to the action of a relatively low proportion of an enzyme preparation until the conversion of the starch in the cocoa is substantially complete, under such conditions of concentration that the cocoa fats are retained in an emulsified condition and the mixture maintained freely flowable, and then finishing into a chocolate syrup.

2. The process of producing a fluid substantially non-thickening chocolate syrup from cocoa, which consists in subjecting a pasty or syrupy mixture of cocoa and water to the action of a relatively low proportion of a diastasic enzyme preparation until the conversion of the starch in the cocoa is substantially complete, under such conditions of concentration that the cocoa fats are retained in an emulsified condition and the mixture maintained freely flowable, and then finishing into a chocolate syrup.

3. The process of producing a fluid substantially non-thickening chocolate syrup from cocoa, which consists in subjecting a pasty or syrupy mixture of cocoa and water to the action of a relatively low proportion of Pancreatin until the conversion of the starch in the cocoa in substantially complete, under such conditions of concentration that the cocoa fats are retained in an emulsified condition, and then finishing into a chocolate syrup.

4. The process of producing a fluid substantially non-thickening chocolate syrup from cocoa powder which consists in making a pasty or syrupy mixture of cocoa powder and water of a concentration which will substantially prevent the subsequent separation of the cocoa fats, heating the mixture until the cocoa paste thickens, subjecting the mixture under suitable conditions of temperature and pH to the action of a relatively low proportion of a diastasic enzyme preparation until the cocoa starch is substantially converted and the fats are retained in an emulsified condition, and then adding sugar and finishing into a syrup.

5. The process of producing a fluid substantially non-thickening chocolate syrup from cocoa which consists in making a pasty or syrupy mixture of cocoa powder and water of a concentration which will substantially prevent the subsequent separation of the cocoa fats, heating the mixture to about 85° C. until the cocoa paste thickens, cooling the mixture, subjecting the mixture to the action of a diastasic enzyme preparation under suitable conditions of temperature and pH until the cocoa starch is substantially converted and the fats are retained in an emulsified condition, and then adding sugar and finishing into a syrup.

6. The process of producing a fluid substantially non-thickening chocolate syrup from cocoa powder which consists in making a pasty or syrupy mixture of cocoa powder, sugar and water of a concentration which will substantially prevent the subsequent separation of the cocoa fats, heating the mixture to about 85° C. until the cocoa paste thickens, cooling the mixture to about 38° C., subjecting the mixture to the action of a Pancreatin preparation until the cocoa starch is substantially converted and the fats are retained in an emulsified condition, and finishing into a syrup.

7. The process of producing a chocolate syrup from cocoa powder which will remain freely flowable for long periods, which consists in making a pasty or syrupy mixture of cocoa powder and water in the proportion of about one to three, heating the mixture to about 80° C., permitting the mixture to stand a short time, cooling the mixture to about 38° C., adding to the mixture a relatively low proportion of a diastatic enzyme, and permitting the enzyme action to take place until the cocoa starch is substantially converted and the fats are retained in an emulsified condition, adding sugar, and finishing into a syrup.

8. As a new article of manufacture, a chocolate syrup prepared from cocoa having the physical characteristic that it is freely pourable and non-thickening after prolonged keeping, which is substantially free from unconverted cocoa starch, and contains the cocoa fats in an emulsified condition.

9. As a new article of manufacture, a chocolate syrup prepared from cocoa having the physical characteristic that it is freely pourable and non-thickening after prolonged keeping, which is substantially free from unconverted cocoa starch, and contains the cocoa fats in an emulsified condition and sugar.

In testimony whereof, I have hereunto set my hand.

MAX WALLERSTEIN.